(12) United States Patent
Bruckert et al.

(10) Patent No.: US 12,280,449 B2
(45) Date of Patent: Apr. 22, 2025

(54) METHOD AND APPARATUS FOR CUTTING AND ABLATING A WORKPIECE WITH A COMPLEX FLUID-JET-GUIDED LASER BEAM

(71) Applicant: SYNOVA S.A., Duillier (CH)

(72) Inventors: Florent Bruckert, Sciez-sur-Léman (FR); Gilles Soulier, Romont (CH); Grégoire Laporte, Prilly (CH); Bernold Richerzhagen, Saint-Sulpice (CH)

(73) Assignee: SYNOVA S.A., Duillier (CH)

( * ) Notice: Subject to any disclaimer, the term of this patent is extended or adjusted under 35 U.S.C. 154(b) by 820 days.

(21) Appl. No.: 17/424,520

(22) PCT Filed: Jan. 21, 2020

(86) PCT No.: PCT/EP2020/051361
§ 371 (c)(1),
(2) Date: Jul. 21, 2021

(87) PCT Pub. No.: WO2020/152136
PCT Pub. Date: Jul. 30, 2020

(65) Prior Publication Data
US 2022/0134481 A1 May 5, 2022

(30) Foreign Application Priority Data

Jan. 22, 2019 (EP) ..................................... 19152959

(51) Int. Cl.
*B23K 26/38* (2014.01)
*B23K 26/0622* (2014.01)
(Continued)

(52) U.S. Cl.
CPC .......... *B23K 26/38* (2013.01); *B23K 26/0622* (2015.10); *B23K 26/146* (2015.10); *B23K 26/3576* (2018.08); *B23K 2103/04* (2018.08)

(58) Field of Classification Search
CPC ............ B23K 2103/04; B23K 26/3576; B23K 26/146; B23K 26/0622; B23K 26/38
(Continued)

(56) References Cited

U.S. PATENT DOCUMENTS 4,827,099 A * 5/1989 Krebs .................... C21D 9/505
219/121.64
4,873,413 A * 10/1989 Uesugi .............. H01L 21/32051
219/121.84
(Continued)

FOREIGN PATENT DOCUMENTS

| CN | 102896430 A | 1/2013 |
|---|---|---|
| EP | 2 208 568 A1 | 7/2010 |

(Continued)

OTHER PUBLICATIONS

International Search Report and Written Opinion issued in connection with the corresponding International Application No. PCT/EP2020/051361 on Apr. 15, 2020.
(Continued)

*Primary Examiner* — Jimmy Chou
(74) *Attorney, Agent, or Firm* — The H.T. Than Law Group

(57) ABSTRACT

The invention relates to a method 100 and an apparatus 300 for cutting or ablating a particular material of the workpiece with a pulsed laser beam coupled into a fluid jet. The method comprises producing the pulsed laser beam with at least one laser source, providing the pressurized fluid jet onto the workpiece, and coupling the pulsed laser beam into the fluid jet towards the workpiece. The pulsed laser beam comprises
(Continued)

at least two superimposed pulsations selected based on the particular material of the workpiece. A first pulsation has a different power and frequency than a second pulsation.

16 Claims, 10 Drawing Sheets

(51) Int. Cl.
  *B23K 26/146* (2014.01)
  *B23K 26/352* (2014.01)
  *B23K 103/04* (2006.01)
(58) Field of Classification Search
  USPC .................................................. 219/121.72
  See application file for complete search history.

(56) References Cited

U.S. PATENT DOCUMENTS

| | | | | |
|---|---|---|---|---|
| 4,925,523 A * | 5/1990 | Braren | B23K 26/066 | 219/121.76 |
| 5,272,309 A * | 12/1993 | Goruganthu | B23K 26/0613 | 219/121.64 |
| 5,302,547 A * | 4/1994 | Wojnarowski | H05K 3/0041 | 216/45 |
| 5,554,335 A * | 9/1996 | Fields | B23K 26/16 | 264/434 |
| 5,562,840 A * | 10/1996 | Swain | B23K 26/361 | 216/75 |
| 5,902,499 A * | 5/1999 | Richerzhagen | B23K 26/1423 | 219/121.72 |
| 6,311,099 B1 * | 10/2001 | Jasper | B23K 26/04 | 706/900 |
| 6,507,003 B2 * | 1/2003 | Amako | B23K 26/066 | 219/121.76 |
| 6,580,055 B2 * | 6/2003 | Iso | B23K 26/0643 | 219/121.7 |
| 6,809,291 B1 * | 10/2004 | Neil | B23K 26/0624 | 219/121.76 |
| 6,861,614 B1 * | 3/2005 | Tanabe | H01L 21/02678 | 438/166 |
| 8,269,137 B2 * | 9/2012 | Ehrmann | B23K 26/40 | 29/847 |
| 8,330,070 B2 * | 12/2012 | Sano | B23K 26/067 | 219/121.84 |
| 9,346,130 B2 * | 5/2016 | Lei | C03B 33/082 | |
| 9,676,058 B2 * | 6/2017 | Hu | B23K 26/40 | |
| 11,224,939 B2 * | 1/2022 | Schnick | B23K 26/0648 | |
| 11,292,081 B2 * | 4/2022 | Hu | B23K 26/146 | |
| 2002/0000426 A1 * | 1/2002 | Mead | B23K 26/0622 | 219/121.76 |
| 2003/0155336 A1 * | 8/2003 | Kreuter | B23K 26/0604 | 219/121.76 |
| 2003/0183603 A1 * | 10/2003 | Forsman | B23K 26/0613 | 219/121.61 |
| 2004/0011772 A1 * | 1/2004 | Okumura | H01L 21/02678 | 219/121.76 |
| 2004/0134894 A1 * | 7/2004 | Gu | B23K 26/0736 | 257/E23.15 |
| 2004/0134896 A1 * | 7/2004 | Gu | B23K 26/04 | 257/E23.15 |
| 2004/0182838 A1 * | 9/2004 | Das | H01S 3/005 | 219/121.76 |
| 2005/0098548 A1 * | 5/2005 | Kobayashi | B23K 26/067 | 219/121.73 |
| 2005/0218122 A1 * | 10/2005 | Yamamoto | B23K 26/0622 | 219/121.61 |
| 2005/0247683 A1 * | 11/2005 | Agarwal | B23K 26/40 | 219/121.76 |
| 2006/0081573 A1 * | 4/2006 | Wissenbach | C21D 1/09 | 219/121.66 |
| 2006/0189034 A1 * | 8/2006 | Tanabe | H01L 29/78675 | 438/117 |
| 2006/0261051 A1 * | 11/2006 | Unrath | B23K 26/0613 | 219/121.76 |
| 2007/0193990 A1 * | 8/2007 | Richerzhagen | B23K 26/146 | 219/121.84 |
| 2007/0199927 A1 * | 8/2007 | Gu | B23K 26/0626 | 219/121.69 |
| 2007/0278195 A1 * | 12/2007 | Richerzhagen | B23K 26/146 | 239/416.4 |
| 2008/0121627 A1 * | 5/2008 | Bruland | B23K 26/042 | 257/E23.15 |
| 2008/0191390 A1 * | 8/2008 | Fukushima | B23K 26/042 | 219/121.69 |
| 2009/0250605 A1 * | 10/2009 | Scigocki | H01J 49/0036 | 250/282 |
| 2010/0147812 A1 * | 6/2010 | Beck | B23K 26/0648 | 219/121.75 |
| 2011/0210105 A1 * | 9/2011 | Romashko | B23K 26/042 | 219/121.72 |
| 2011/0284510 A1 * | 11/2011 | Reeves-Hall | B23K 26/0853 | 219/121.72 |
| 2012/0061356 A1 * | 3/2012 | Fukumitsu | B23K 26/0604 | 219/121.61 |
| 2012/0160815 A1 * | 6/2012 | Hayashimoto | B23K 26/32 | 219/121.64 |
| 2012/0298638 A1 * | 11/2012 | Beck | B23K 26/26 | 219/121.64 |
| 2012/0325784 A1 * | 12/2012 | Moffatt | B23K 26/354 | 219/121.61 |
| 2013/0174301 A1 * | 7/2013 | Robinson | G02B 21/26 | 250/307 |
| 2013/0183833 A1 * | 7/2013 | Duan | B23K 26/0676 | 219/121.73 |
| 2014/0144893 A1 * | 5/2014 | Yang | B23K 9/0026 | 219/137 R |
| 2014/0256161 A1 * | 9/2014 | Li | B23K 26/352 | 438/795 |
| 2014/0308803 A1 * | 10/2014 | Chung | B23K 26/0604 | 219/121.75 |
| 2015/0014889 A1 * | 1/2015 | Goya | B23K 26/0652 | 219/121.72 |
| 2015/0165548 A1 * | 6/2015 | Marjanovic | C03B 33/091 | 219/121.73 |
| 2015/0230341 A1 * | 8/2015 | Milne | H01S 3/0057 | 219/121.68 |
| 2015/0246412 A1 * | 9/2015 | Mendes | B23K 26/0006 | 219/121.7 |
| 2015/0273624 A1 * | 10/2015 | Yoshida | C03B 23/203 | 428/209 |
| 2015/0336208 A1 * | 11/2015 | Sokol | B23K 26/356 | 359/278 |
| 2016/0067819 A1 * | 3/2016 | Kuki | B23K 26/364 | 219/121.82 |
| 2016/0083815 A1 * | 3/2016 | Glaser | C21D 10/005 | 72/56 |
| 2016/0250714 A1 * | 9/2016 | Zhang | B23K 26/36 | 219/121.61 |
| 2016/0368090 A1 * | 12/2016 | Gaebelein | B23K 26/142 | |
| 2017/0028510 A1 * | 2/2017 | Shin | B23K 26/362 | |

FOREIGN PATENT DOCUMENTS

| | | | | |
|---|---|---|---|---|
| JP | 2018170474 A | | 11/2018 | |
| JP | 7194588 B2 | * | 12/2022 | ............ B23K 26/082 |
| WO | 2006/118454 A1 | | 11/2006 | |

OTHER PUBLICATIONS

Korean Office Action and its English translation issued in connection with the corresponding Korean Patent Application No. 10-2021-7022995 on Feb. 13, 2024.

Extended European Search Report issued in connection with the corresponding European Patent Application No. 19 152 959.3 on Sep. 30, 2019.

(56) References Cited

OTHER PUBLICATIONS

Japanese Office Action issued in connection with the corresponding Japanese Patent Application No. 2021-541693 on Oct. 20, 2023 and its English translation.
Machine translation of JP 2018170474 A to Mitsuboshi Diamond Ind Co Ltd.
Machine translation of CN 102896430 A to Xiao et al.
First Office Action issued in connection with the corresponding Chinese Patent Application No. 202080010511.5 on Dec. 27, 2022.
Translation of First Office Action issued in connection with the corresponding Chinese Patent Application No. 202080010511.5 on Dec. 27, 2022.
Second Office Action issued in connection the corresponding Chinese Patent Application No. 202080010511.5 on Aug. 11, 2023.
Translation of Second Office Action issued in connection the corresponding Chinese Patent Application No. 202080010511.5 on Aug. 11, 2023.

\* cited by examiner

METHOD AND APPARATUS FOR CUTTING AND ABLATING A WORKPIECE WITH A COMPLEX FLUID-JET-GUIDED LASER BEAM

TECHNICAL FIELD

The present invention relates to a method and an apparatus for cutting or ablating a workpiece, specifically a particular material of the workpiece, with a laser beam that is coupled into a pressurized fluid jet. The laser beam used by the method and apparatus is a complex pulsed laser beam, i.e. is a pulsed laser beam that comprises multiple superimposed laser pulsations. According to embodiments of the invention, the different pulsations of the complex pulsed laser beam may have different effects on the workpiece, for example, may respectively be used for cutting or ablating, and smoothing the particular material of the workpiece.

BACKGROUND

A conventional method for machining a workpiece uses a simple laser beam coupled into a pressurized fluid jet. In order to cut the workpiece with the laser beam, the fluid jet is moved along a determined cutting path over the workpiece. The fluid jet is typically generated with a fluid jet generation nozzle, and the laser beam is coupled into and guided in the fluid jet onto the workpiece by means of total internal reflection. The laser beam in the conventional method is either a continuous laser beam or a pulsed laser beam including a single laser pulsation.

A problem often encountered with the conventional method, in particular when cutting deeply into or even through a workpiece with the fluid-jet-guided laser beam, is that a surface quality of the cut is poor and/or suffers from defects. For example, the cut surface often exhibits a too high surface roughness and/or surface quality changes appear randomly along the cut.

Furthermore, the conventional method often produces defects in the workpiece material while cutting it, particularly causes material to chip out. For example, both the front and backside of the workpiece may be harmed by such chippings. Additionally, sharp edges are typically created along the cut when performed with the conventional method.

The above-mentioned problems make it difficult, or even impossible, to cut certain kinds of materials with the conventional method and apparatus. For example, new kinds of alloy materials or very brittle materials. Additionally, the above-mentioned problems put a significant limit on the cutting depth into the workpiece or on the total thickness of a workpiece, which is to be separated into two or more parts.

Therefore, embodiments of the invention aim at improving the conventional method and apparatus for cutting or ablating a workpiece with a fluid-jet-guided laser beam. An objective is in particular to provide such a method and apparatus, which are suitable for cutting or ablating a workpiece with an improved cutting or ablation result. Generally a surface quality of the cut surface or ablation surface should be better than when using the conventional method or apparatus. More specifically, a surface roughness of the cut surface or ablation surface should be significantly lower. Further, surface quality changes and defects or chippings appearing along a cut should be reduced or avoided.

The above objective should particularly be achievable in cutting or ablating all kinds of different materials, particularly new alloy materials and very brittle materials. Furthermore, the method and apparatus should be capable of cutting or ablating deeper into a workpiece or of separating a thicker workpiece than it is possible with the conventional method and apparatus.

SUMMARY OF THE INVENTION

The objective is achieved by the embodiments presented in the enclosed independent claims. Advantageous implementations of these embodiments are defined in the dependent claims.

In particular, embodiments of the invention base on the use of a complex pulsed laser beam, which is coupled into a fluid jet. The complex pulsed laser beam is specifically adapted to the material to be cut, in order to cut with an improved quality.

A first aspect of the invention provides a method for cutting or ablating a particular material of a workpiece with a pulsed laser beam, the method comprising: producing the pulsed laser beam with at least one laser source, providing a pressurized fluid jet onto the workpiece, and coupling the pulsed laser beam into the fluid jet towards the workpiece, wherein the pulsed laser beam comprises at least two superimposed pulsations selected based on the particular material of the workpiece, wherein a first pulsation has a different power and frequency than a second pulsation.

In other words, for a single workpiece material, which is to be cut or ablated using the method of the first aspect, at least two pulsations are selected and combined to form a complex pulsed laser beam. Each laser pulsation contributes a certain, particularly regular, pulse shape to the complex pulsed laser beam—i.e. at least a first laser pulse shape with a first laser power and first laser frequency and a second laser pulse shape with a second laser power and second laser frequency. The two laser powers and laser frequency superimpose. Thus, the complex pulsed laser beam may show a beating pattern.

Primarily the method is designated for cutting or ablating a workpiece that is made of a solid block of one type of material (the particular material) and uses the at least two pulsations for cutting this particular material. However, the method can also be applied to a workpiece including more than one material, e.g. a workpiece that is made of layers of different materials. In this case, each material layer is ideally cut or ablated individually by using at least two pulsations per layer. If two such material layers are to be cut or ablated at the same time, then preferably multiple pulsations are selected, particularly at least two pulsations per layer.

A first pulsation in the pulsed laser beam may be created by a dominant/master laser emission, e.g. output by a first laser source, and the second pulsation may be created by a slave laser emission, e.g. output by a second laser source. Each laser source may be configured to output a simple pulsed laser beam with a determined power (absolute peak power and/or pulse width) and frequency (pulse repetition rate). For example, the dominant/master laser emission may be selected such that the particular material to be cut or ablated shows a stronger absorption of that laser light and/or that it is of higher intensity than the slave laser emission, while the slave laser emission is selected such that the particular material shows a weaker absorption of that laser light and/or that it is of lower intensity than the dominant laser emission. However, the effects associated with the master/slave laser emissions described here are not necessarily defined in this document according to the naming "first" and "second" pulsation. The selection of power and frequency of each laser pulsation may thus be based (depend) on a frequency-dependent absorption coefficient of the particular material to be cut or ablated. In other words, the particular material may absorb differently at different laser emission wavelengths and pulse characteristics. Notably, two superimposed laser pulsations may also be created by a single, dedicated laser source.

The complex pulsed laser beam can thus be composed such that it creates a cut through/into the workpiece material, which leaves the cut surface very homogeneous, or such that it creates an ablation of the workpiece material, which leaves the surface of ablation very homogeneous. The cut surface (when cutting with the laser beam) is formed along the propagation direction of the laser beam, e.g., perpendicular to the workpiece surface if the laser beam impinges perpendicularly onto the workpiece surface. Cutting can, for instance, spilt the workpiece into two parts. The ablation surface, also referred to as milling surface (when ablating/milling with the laser beam) is formed by removing workpiece material layer-by-layer from the workpiece surface. Thus, the ablation/milling surface becomes the new workpiece surface, and may be parallel to the original workpiece surface if one or more layers of homogeneous thickness is removed. Notably, a layer of ablated workpiece material defines the ablation surface quality.

In particular, by selecting the at least two pulsations in dependence of the particular workpiece material, a very low surface roughness and few or even no surface quality changes can be achieved for the cut surface or the ablation surface. Furthermore, the occurrence of defects and chippings can be significantly reduced or even suppressed completely. Also, the so-called taper effect of the cut surface is avoided. Thus, the method of the first aspect overall improves the cutting and/or ablating of workpieces, particularly of workpieces made of hard and/or brittle material. In addition, the method of the first aspect allows cutting deeper into or through a thicker workpiece than with a conventional method, or allows ablating a thicker layer of workpiece material, without sacrificing surface quality of the cut.

In an implementation form of the method, the first pulsation is suitable to cut or ablate the particular material of the workpiece, and the second pulsation is not suitable to cut or ablate the particular material of the workpiece.

This means that the first pulsation in the pulsed laser beam (i.e. the dominant laser emission) taken alone would already cut through, or at least substantially into, or ablate, the workpiece, but with a relatively bad surface quality. The second pulsation (second pulsed laser emission) taken alone would not be able to cut through or substantially into the workpiece, or ablate the workpiece, but may only be able to scratch a surface of the workpiece. These abilities of the two laser pulsations are due to their specific characteristics, in particular due to their respective power and frequency. These characteristics are selected based on the type of material that is to be cut or ablated. The at least two laser pulsations, when superimposed in the pulsed laser beam used by the method of the first aspect, work together to cut or ablate the workpiece with an improved surface quality.

In an implementation form of the method, the first pulsation is suitable to cut or ablate the particular material of the workpiece, and the second pulsation is suitable to smooth a surface of the particular material of the workpiece, particularly to smooth a surface created by cutting or ablating the particular material with the first pulsation.

This leads to smoother edges of the cut and also to a considerably lower surface roughness, or to a smoother ablation surface. Additionally, defects and material chipping can largely be avoided.

In an implementation form of the method, the second pulsation is suitable to smooth the surface of a homogenous metallic or ceramic material as the particular material of the workpiece to an arithmetic average of the roughness profile equal to or below 0.3 µm, particularly 0.1 µm.

Thus, very smooth cuts or a smooth ablation are possible. The thickness of the workpiece material may thereby be 0.3-1 mm, e.g. in the order of 0.5 mm, or may even be more than 1 mm, in particular several mm, e.g., 1-5 mm. Further, a straightness of the cut may be high, in particular the cut may be purely vertical (wherein "vertical" is defined by the intended cut direction, which is e.g. in line with the direction of the pressurized fluid jet and the laser beam guided therein. In addition, no ridges are created at the lower edge of the cut workpiece material, unlike if a pulsed laser beam with only one pulsation would be used.

In an implementation form of the method, a thickness of the particular material of the workpiece is 1 mm or more.

For instance, the thickness may be several mm. Thus, a significantly thicker workpiece than conventionally can be cut or ablated.

In an implementation form, the method is for cutting or ablating more than one material of the workpiece, wherein the workpiece comprises multiple different material layers, and the pulsed laser beam comprises at least two superimposed pulsations selected per material layer of the workpiece.

That is, multiple (particular) materials of the workpiece can be cut or ablated. For example, the workpiece may be a multi-material workpiece, comprising or made of different material layers. The material layers may comprise a metal, a semiconductor, and/or a ceramic.

In an implementation form of the method, the at least two superimposed pulsations are selected based further on at least one parameter, particularly based on a width and/or pressure, of the fluid jet.

The specific environment of the fluid jet guided laser beam is thereby taken into account. For example, the at least two pulsations are selected such that no instability or breakdown of the fluid jet occurs. For instance, assuming that the fluid jet is a water jet, the two pulsations are selected such that the water is not evaporated. Further, interactions of the laser beam (the superimposed laser pulsations) with the fluid are taken into account, e.g. a possible frequency shift, damping of the laser light by the fluid.

For selecting the two pulsations such that no instability of breakdown of the fluid jet occurs, the following is relevant. The selected characteristics of the laser pulsations (pulse width, pulse energy, average power) usually show a non-linear interaction with the fluid jet. A potential fluid jet breakdown (i.e. water vaporization/cavitation and change of hydrodynamic modes & nodes of the fluid jet) mainly depends on the frequency and pulse energy of a laser pulsation. Thus, the frequency and/or pulse energy may be selected based on the type of the fluid, or characteristics (e.g. width, pressure) of the fluid jet. Moreover, it also depends on a spatial laser beam coupling ratio into the fluid jet. Thus, the diameter of the laser beam may be selected to be smaller than half a diameter of a nozzle, which is used for producing the fluid jet. Moreover, there is typically a specific breakdown fluence according to the properties of the fluid jet and the pulse characteristics. Thus, a peak pulse intensity of a laser pulsation may be selected to by smaller than $2\ GW/cm^{-2}$.

In an implementation form of the method, a frequency of the first pulsation is different from an integral multiple of a frequency of the second pulsation.

This leads to a superposition pattern of the pulsed laser beam, which allows each pulsation to contribute to smoothly cutting or ablating the workpiece.

In an implementation form of the method, a frequency of the first pulsation is of a different technical regime than a frequency of the second pulsation, wherein in particular a frequency of the first pulsation is between 1-40 kHz and a frequency of the second pulsation is between 60-250 kHz.

Additionally, the pulsed laser beam may comprise at least a third pulsation. The third pulsation may have a frequency between 100 kHz-1 MHz. With such a complex pulsed laser beam, including three different pulsations, particularly good results are achieved. The different technical regimes may be chosen according to different purposes of the different pulsations, e.g. rough cutting or rough ablating with the first pulsation, rough smoothing of the cut surface/edges or ablation surface with the second pulsations, and fine smoothing of the cut surface/edges or ablation surface with the third pulsation.

In an implementation form of the method, the first pulsation and the second pulsation are synchronous.

In an implementation form of the method, the first pulsation and the second pulsation are asynchronous.

In this way, complex superimposed pulsations can be generated in the pulsed laser beam, which may vary over time. This could be used to cut specific inhomogeneous cuts into a workpiece or to compensate for some structures on the workpiece surface.

In an implementation form of the method, at least one of the first pulsation and the second pulsation comprises a burst of a plurality of sub-pulses.

In particular, each pulse of the first and/or second pulsation comprises a burst of a plurality of sub-pulses. The respective burst is made up of the respective sub-pulses. The at least one laser source generating the first and/or second pulsation may be configured to emit on multiple frequencies, the higher frequencies being characteristic for the burst-interpulse, the lower frequencies being characteristic for the burst repetition rate. The bursts may be generated with a fixed duration between adjacent sub-pulses. A longer fixed duration may be applied between adjacent bursts, i.e., between the last sub-pulse of one burst and the first sub-pulse of the next burst.

In an implementation form of the method, the particular material of the workpiece is a cobalt-chromium-nickel alloy, particularly is phynox (i.e. a specific cobalt-chromium-nickel-alloy), or is a copper-zinc-nickel alloy, or a copper-based alloy, amorphous steel, the first pulsation has a frequency of 4-8 kHz and a full width at half maximum (FWHM) pulse width of 90-160 ns, and the second pulsation has a frequency of 80-120 kHz and a FWHM pulse width of 5-20 ns.

In an implementation form of the method, the particular material of the workpiece is a semiconductor, the first pulsation has a frequency of 18-40 kHz and a FWHM pulse width of 200-500 ns and the second pulsation has a frequency of 100-300 kHz and a FWHM pulse width of 15-30 ns.

In an implementation form of the method, the particular material of the workpiece is an ultra-hard material, particularly a ceramic or diamond, the first pulsation has a frequency of 1-13 kHz and a FWHM pulse width of 100-190 ns, and the second pulsation has a frequency of 50-150 kHz and a FWHM pulse width of 6-20 ns.

The exemplary parameters given above lead to an extraordinary surface quality of the cut surface or ablation surface, especially for workpieces made from the mentioned materials.

A second aspect of the invention provides an apparatus for cutting or ablating a particular material of a workpiece with a pulsed laser beam, the apparatus comprising: at least one laser source configured to produce the pulsed laser beam, and a machining unit configured to provide a pressurized fluid jet onto the workpiece and to couple the pulsed laser beam into the fluid jet towards the workpiece, wherein the pulsed laser beam comprises at least two superimposed pulsations selected based on the particular material of the workpiece, wherein a first pulsation has a different power and frequency than a second pulsation.

The apparatus of the second aspect achieves the same advantages as mentioned above for the method of the first aspect. That is, with the apparatus of the first aspect, the workpiece material can be cut or ablated with a higher quality than with a conventional apparatus.

In an implementation form, the apparatus comprises a single laser source configured to produce the pulsed laser beam.

In an implementation form, the apparatus comprises a plurality of laser sources configured to produce the pulsed laser beam.

For instance, in case of two laser sources, the color (wavelength) of the laser light may be different, e.g. 532 nm and 515 nm (green), or 532 nm (green) and 1024 nm (infrared).

In an implementation form, the apparatus comprises an optical arrangement configured to combine laser light emitted by each of the plurality of laser sources, in order to produce the pulsed laser beam, and an optical coupling element configured to guide the pulsed laser beam to the machining unit.

That means, the optical arrangement is arranged outside of the machining unit. For instance, the optical arrangement may be inside in a laser unit comprising the laser sources or in a common laser head for the laser sources.

In an implementation form of the apparatus, the laser light emitted by the plurality of laser sources comprises at least two different pulsation frequencies and/or two different colors.

The apparatus of the second aspect may further include peripheral devices, like a laser controller, water supply controller, gas supply controller, or movement axes controller.

BRIEF DESCRIPTION OF DRAWINGS

The above-described aspects and implementation forms of the invention are explained in the following description of specific embodiments in relation to the enclosed drawings, in which.

DETAILED DESCRIPTION OF EMBODIMENTS

Figure 1:
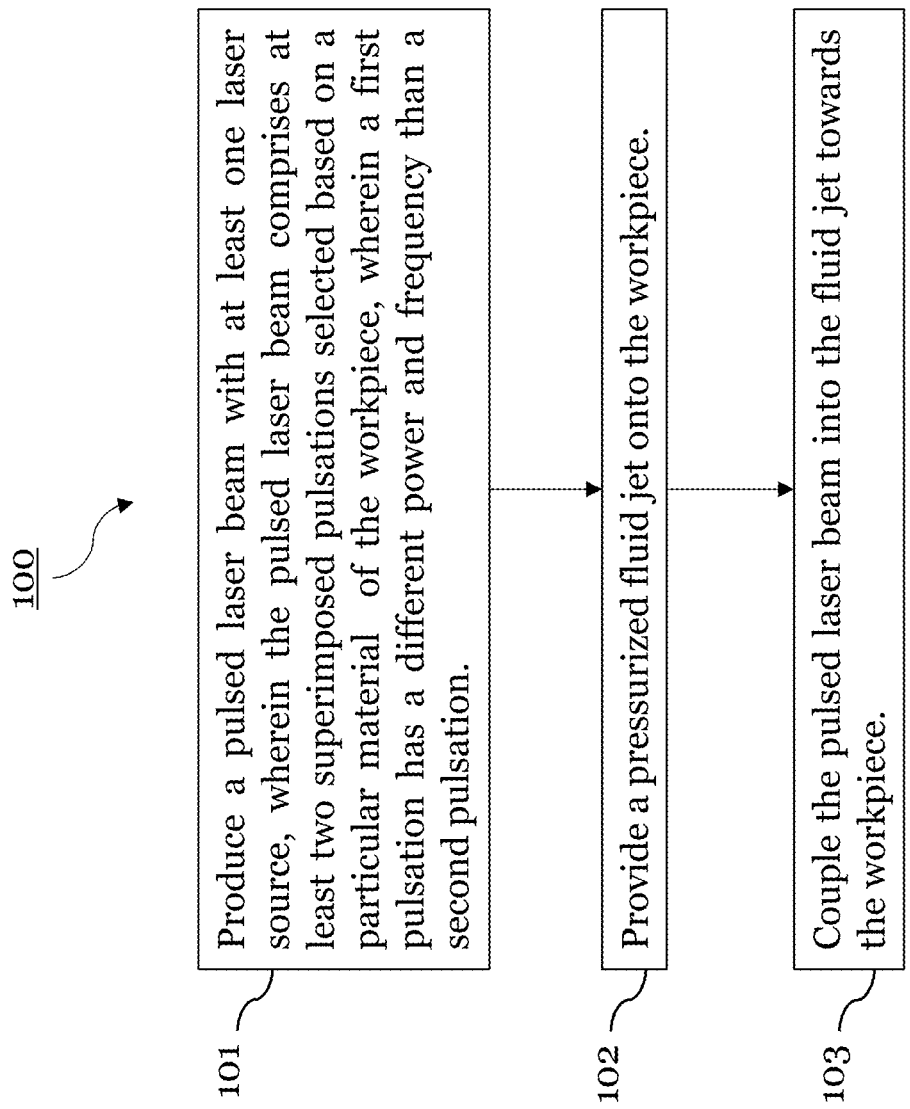
FIG. 1 shows a flow-diagram of a method according to an embodiment of the invention.

FIG. 1 shows a method 100 according to an embodiment of the invention in a flow-diagram. The method 100 is in particular suitable for cutting or ablating a particular material of a workpiece 310 with a pulsed laser beam 200. The method 100 may be performed by or with an apparatus 300 according to an embodiment of the invention (see FIG. 3 for details on the apparatus 300).

Figure 2:
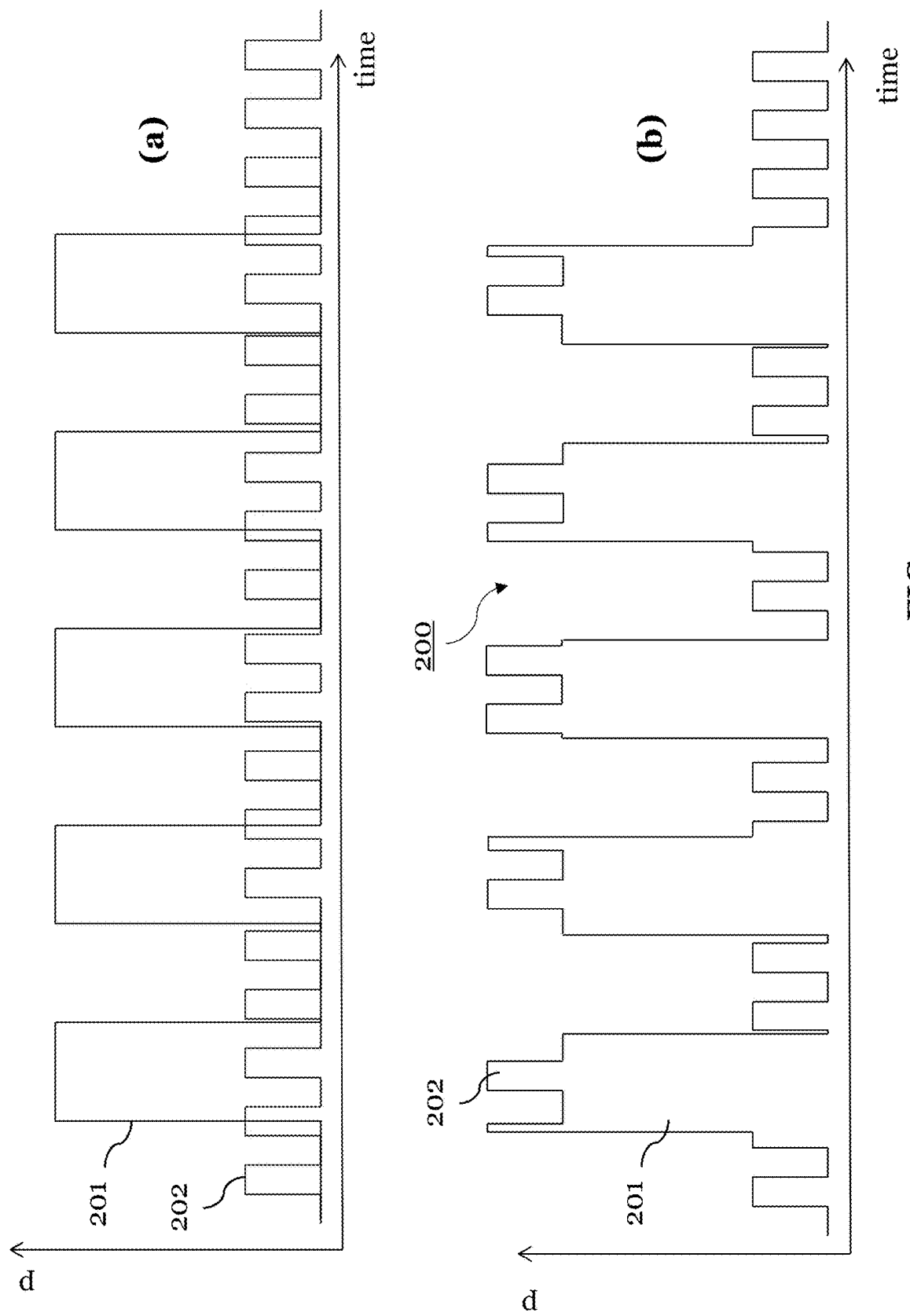
FIGS. 2(a) and (b) show schematically a pulsed laser beam used in a method according to an embodiment of the invention.

The method 100 includes a first step 101 of producing a pulsed laser beam 200 (see e.g. FIGS. 2(*a*) and 2(*b*)) with one or more laser sources, e.g. with a first laser sources 301 and/or a second laser source 301*a* of the apparatus 300. Further, the method 100 includes a second step 102 of providing a pressurized fluid jet 303, e.g. output by the apparatus 300, onto the workpiece 310 and a third step 103 of coupling the complex pulsed laser beam 200 into the fluid jet 303 and towards the workpiece 310.

The step 101 of producing the pulsed laser beam 200 is particularly important for the method 100 of FIG. 1. In particular, the pulsed laser beam 200 is produced in dependence of the particular workpiece material, which is to be cut or ablated, i.e. by selecting the pulsations in the laser beam 200 according to the material's properties. To this end, the method 100 comprises producing 101 the pulsed laser beam 200 comprising at least two superimposed pulsations 201 and 202. Each pulsation is selected based on the particular material of the workpiece 310. A first pulsation 201 of the at least two superimposed pulsations has a different power and different frequency than a second pulsation 202 of the at least two superimposed pulsations.

FIG. 2(*b*) shows schematically a complex pulsed laser beam 200 as it may be used in the method 100 shown in FIG. 1. Further, FIG. 2(*a*) shows two pulsations 201 and 202 individually, which may be included in the pulsed laser beam 200. Notably, in FIGS. 2(*a*) and (*b*) a laser power p is indicated on the y-axes and time is indicated on the x-axes. The two pulsations 201 and 202 are superimposed to form the pulsed laser beam 200. The superimposed pulsations 201, 202 produce a complex pattern of laser beam power over time in the final laser beam 200. The two pulsations 201 and 202 are different in power (e.g. in FIGS. 2(*a*) and (*b*) the pulsation 202 has a lower peak power than the pulsation 201) and in frequency (e.g. in FIGS. 2(*a*) and (*b*) the pulsation 202 has a higher frequency than the pulsation 201). The complex pulsed laser beam 200 shown in FIG. 2 (*b*) is in the end used for cutting or ablating the particular workpiece material.

At minimum two individual laser pulsation shapes (created by at least one laser source 301, 301*a*) are superimposed in the laser beam 200. At least two pulsations 201 and 202 thereby have different frequencies. For instance, a frequency of a first pulsation 201 may be between 1-25 kHz, and a frequency of a second pulsation 202 may be between 80-250 kHz. As an example, the first pulsation 201 may have a frequency f1=10 kHz and the second pulsation may have a frequency f2=100 kHz.

Thereby, the frequency f2 may be selected to be not an integral multiple of the frequency f1. Further, f2 may be selected from a technical different regime than f1 (e.g. f1 may be in the ns-regime and f2 in the ps-regime). The at least two pulsations 201 and 202 may further be synchronous or asynchronous, wherein the at least one lase source 301, 301*a* may be configured to switch from synchronous to asynchronous and vice versa.

The first pulsation 201 may be configured to cut or ablate the material alone—but with a bad surface quality, i.e. a high surface roughness e.g. with an arithmetic average of the roughness profile (Ra) of Ra>0.3 µm, or even of Ra>1 µm. Nevertheless, the first pulsation 201 may be considered suitable to cut or ablate the particular material of the workpiece 310. The second pulsation 202 alone may only scratch the particular material (i.e. only the very surface of it), but is not considered suitable to actually cut or ablate the particular material of the workpiece 310 (i.e. provide a certain depth that can be regarded as a cut or ablation).

However, when the at least two pulsations 201 and 202 are combined in the pulsed laser beam 200, the first pulsation 201 may remove the larger part of the particular material to create the cut or ablation, and the second pulsation may smooth the cut surface or ablation surface (e.g. to Ra≤0.3 or even Ra≤0.1). New types of materials can be cut in this way that could not be cut or ablated before.

Figure 3:
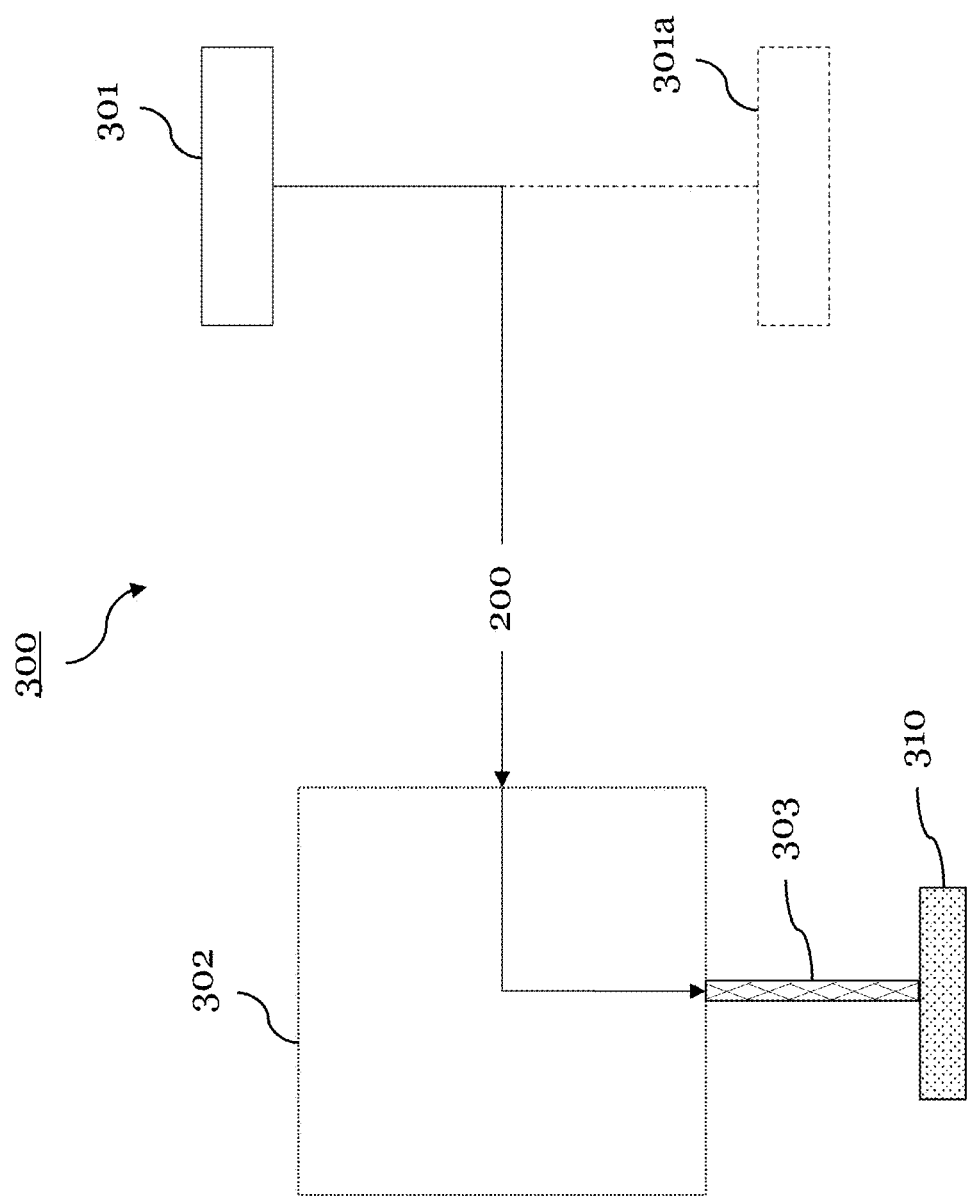
FIG. 3 shows an apparatus according to an embodiment of the invention.

FIG. 3 shows an apparatus 300 according to an embodiment of the invention. The apparatus 300 is generally configured to machine a workpiece 310 with a pulsed laser beam 200 coupled into a pressurized fluid jet 303, in particular to cut or ablate the workpiece 310. To this end, the apparatus 300 is configured to produce and provide the fluid jet 303 with a machining unit 302, and to couple the laser beam 200—received from one laser source 301 or from multiple laser sources 301, 301*a* (two is only an example)—into the fluid jet 303. This coupling is preferably done in the machining unit 302. During the machining process, the workpiece 310 may be positioned on a machining surface, which may or may not be part of the apparatus 300. In either case, the apparatus 300 can be arranged such that it is able to machine the workpiece 210 disposed on the machining surface. The apparatus 300 may thereby control movements of the machining surface in up to three dimensions. The apparatus 300 is in particular able to cut or ablate the workpiece 301, by moving the fluid jet guided laser beam 200 along a cutting path or ablation path over the workpiece 310. The movement may thereby be continuous or stepwise, and a speed of the movement may be selected/changed.

Figure 4:
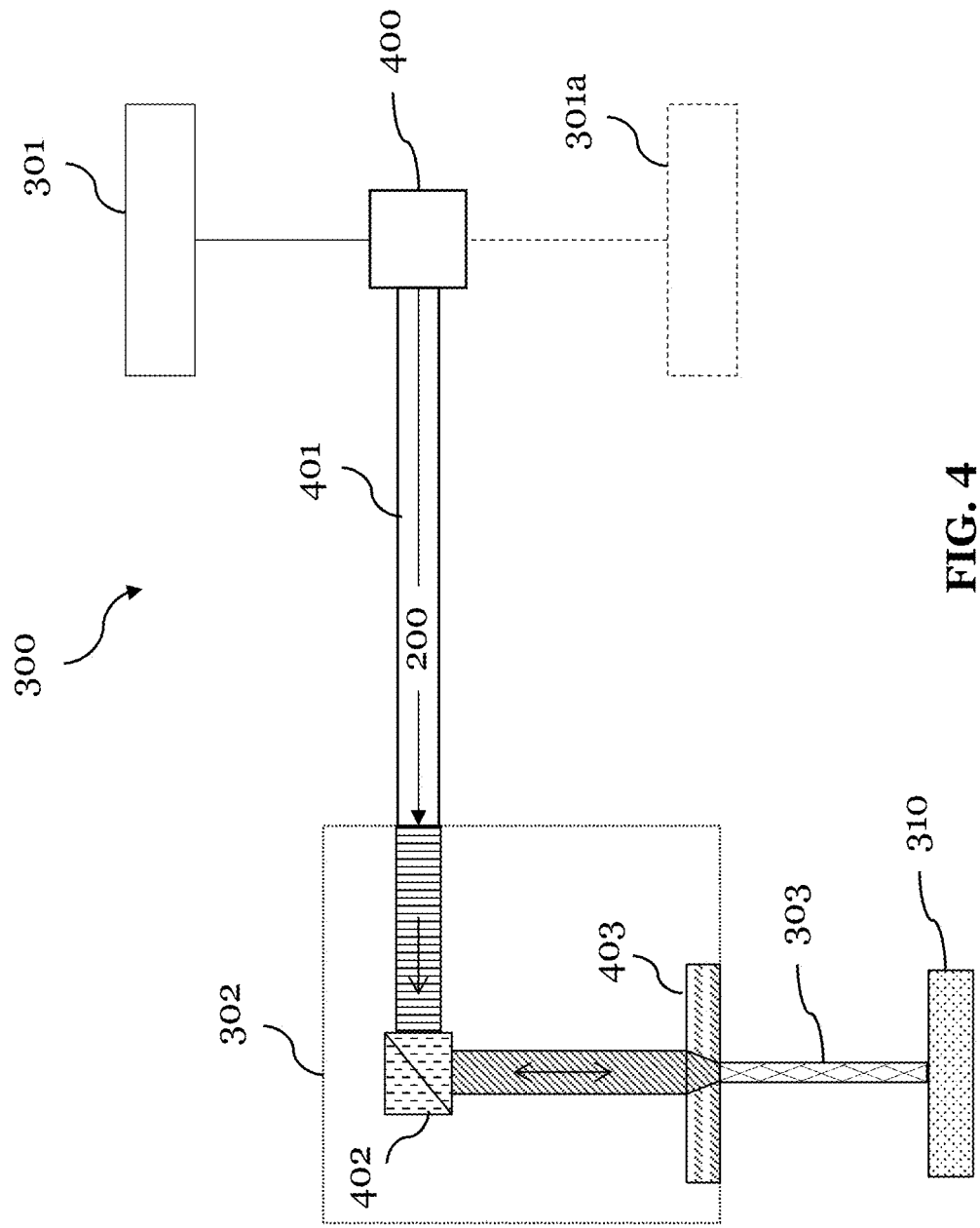
FIG. 4 shows an apparatus according to an embodiment of the invention.

FIG. 4 shows an apparatus 300 according to an embodiment of the invention, which builds on the apparatus 300 shown in FIG. 3. Identical elements in FIG. 3 and FIG. 4 are labeled with the same reference signs and function likewise. Accordingly, the apparatus 300 of FIG. 4 also comprises at least one laser source 301, 301*a* to provide the complex pulsed laser beam 200 to the machining unit 302, where it is coupled into the fluid jet 303.

FIG. 4 shows more details about the optical arrangement and fluid circuitry of the apparatus 300, which may be provided in the machining unit 302. The machining unit 302 may particularly include an optical element, like at least one lens 403, for coupling the laser beam 200 into the fluid jet 303. The laser beam 200 is produced outside of the machining unit 302, and is injected into the machining unit 302. In the machining unit 302, a mirror or beam splitter 402 or other optical element may guide the laser beam 200 towards the at least one lens 403. The beam splitter 402 may also be used to couple part of the laser light out of the apparatus, e.g. for process control. The machining unit 302 may also include an optically transparent protection window (not shown), in order to separate the optical arrangement, here exemplarily the optical element 403, from the fluid circuitry and the region of the machining unit 302 where the fluid jet 303 is produced.

For producing the fluid jet 303, the machining unit 302 may include a fluid jet generation nozzle having a fluid nozzle aperture. The fluid jet generation nozzle is preferably disposed within the machining unit 302 to produce the fluid jet 303 in a protected environment. The fluid nozzle aperture defines the width of the fluid jet 303. The fluid nozzle aperture has, for example, a diameter of 10-200 μm, and the fluid jet 303 has, for example, a diameter of about 0.6-1 times the fluid nozzle aperture. The pressure for the pressurized fluid jet 303 is preferably provided via an external fluid supply. Preferably, the pressure is between 50-800 bar. For outputting the fluid jet 303 from the apparatus 300, the machining unit 302 may include an exit nozzle with an exit aperture. The exit aperture is preferably wider than the fluid nozzle aperture.

FIG. 4 further shows that the apparatus 300 may include an optical arrangement 400, for example a group of optical elements, like lenses. The optical arrangement 400 may be configured to combine laser light emitted by more than one laser sources (in FIG. 4 the two laser sources 301 and 301a), in order to produce the pulsed laser beam 200. Further, the apparatus 300 may comprise an optical coupling element 401, which is configured to guide the pulsed laser beam 200 to and into the machining unit 302. The optical coupling element 401 may, for instance, be an optical fibre.

Figure 5:
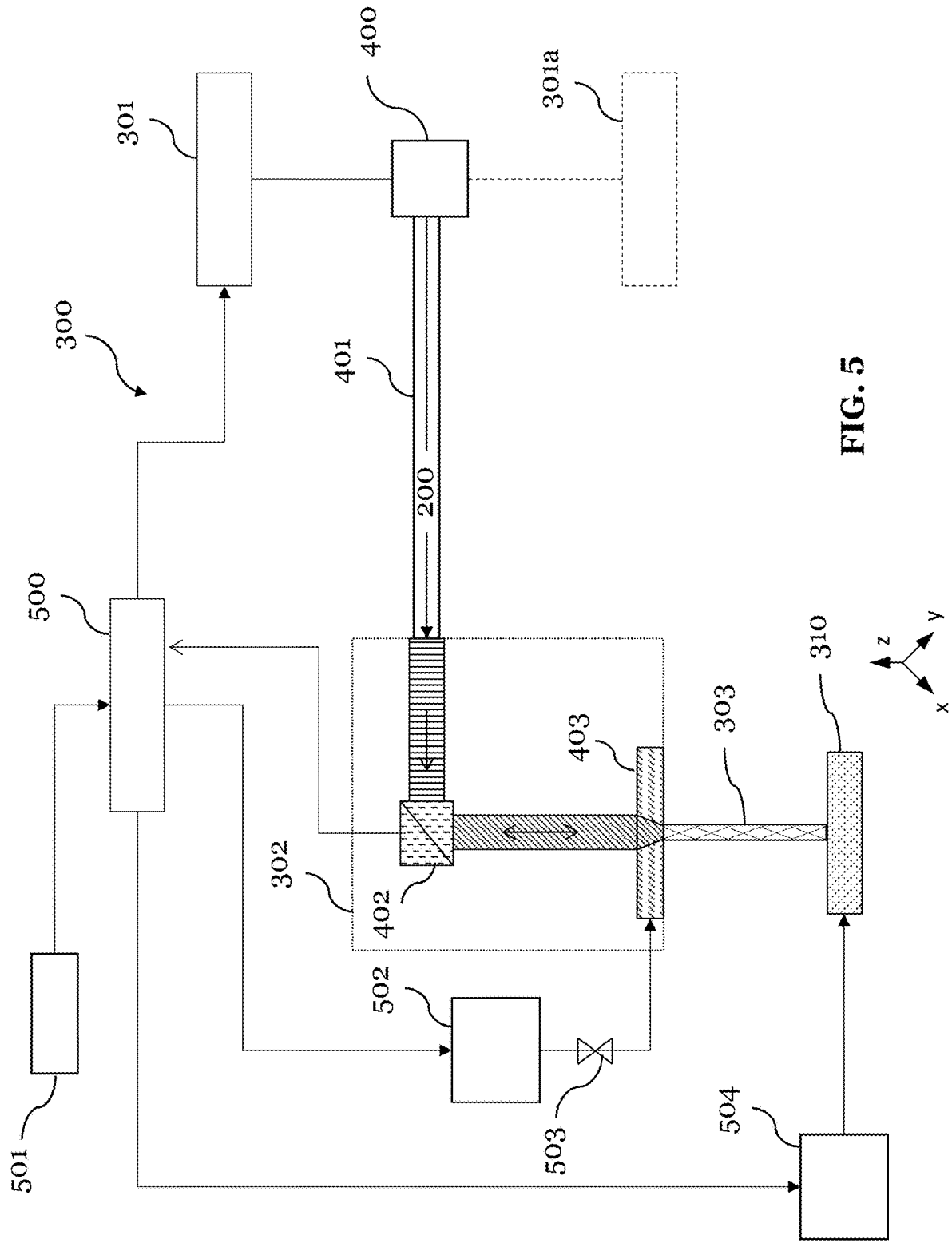
FIG. 5 shows an apparatus according to an embodiment of the invention.

FIG. 5 shows an apparatus 300 according to an embodiment of the invention, which builds on the apparatus 300 shown in FIG. 3. Identical elements in FIG. 4 and FIG. 5 are labeled with the same reference signs and function likewise. Accordingly, the apparatus 300 of FIG. 5 also comprises at least one laser source 301, 301a, in order to provide the complex pulsed laser beam 200 to the machining unit 302, where it is coupled into the fluid jet 303.

The apparatus 300 shown in FIG. 5 further includes a control unit 500, which may control the at least one laser source 301 (e.g. may command a laser controller of the at least one laser source 301, 301a). For instance, the control unit 500 can determine the pulsations 201 and 202 to set in the at least one laser source 301, 301a, which in the end superimpose to make up the complex pulsed laser beam 200. The control unit 500 may also be fed with a signal indicating the at least two pulsations 201 and 202. That is, the control unit 500 may instruct a laser controller of each of the at least one laser source 301, 301a to output an according laser emission. Thereby, the control unit 500 may particularly be locked on one or both of the pulsations 201 and 202 for controlling. The laser controller of each laser source 301, 301a may thereby be able to set a pulse power, pulse width, pulse repletion rate, pulse burst rate (burst rate per pulse, if pulses comprise bursts), or a pause between pulses according to the instructions of the control unit. The apparatus 300 may also include a human-machine interface (HMI) 501, with which a user of the apparatus 300 can provide input to the control unit 500. For instance, the input could contain at least one parameter of the particular material of the workpiece 310 to be cut or ablated. The control unit 500 may then control the at least one laser source 301 and 301 accordingly.

The apparatus 300 can further include several peripheral devices, and the control unit 500 may be further configured to provide one or more of the peripheral devices with instruction signals. In this matter, the control unit 500 can control the peripheral devices in dependence of the selected laser pulsations 201 and 202, and can for example instruct the peripheral devices to start, break, stop and/or restart their respective actions.

For example, the apparatus 300 shown in FIG. 5 includes as peripheral devices a fluid/gas supply controller 502 and a movement axes controller 504 (e.g. a "Computer Numerical Control (CNC)"), which may be configured to move in perpendicular X, Y and Z directions and/or rotational a, b, c directions a machining surface, onto which the workpiece 310 is put, or alternatively the workpiece 310 itself. Thereby, the Z direction may be along the fluid jet 303, and the X and Y directions may be the directions perpendicular to the Z direction, e.g. determining the plane of the machining surface. Accordingly, the workpiece 310 may be moved with three dimensional degrees of freedom, by displacement along one or more of the X, Y and Z directions, or by rotation around one or more axis along these directions, respectively.

The control unit 500 may be configured to provide respective instruction signals to the different peripheral devices. The control unit 500 may control the peripheral devices independently from another. According to the instructions provided by the control unit 500, the peripheral devices can take instructed actions. For instance, the laser controller of the at least one laser source 301, 301a may start, pause or stop the supply of laser light for its laser emission. The fluid/gas supply controller 502 may control a fluid/gas pressure control valve 503, in order to start, break or stop a supply of fluid (e.g. water) and/or gas (e.g. helium as protection gas for the water) to the machining unit 302. The movement axes controller 504 may provide specific movement of the workpiece 310, i.e. it can control a machining surface, onto which the workpiece 310 is disposed. In this way, the workpiece 301 may be moved relative to the laser beam 200 in the fluid jet 303 and a cutting path or ablation path may be defined.

The movement axes controller 504 may be configured to change the x-y-z-position of the workpiece 310 relative to the machining unit 302. In particular, the movement axes controller 504 may change the position of the workpiece 310 after each laser pulse of the pulsed laser beam 200. Thereby, the workpiece position may be changed stepwise or continuously. It is also possible that the movement axes controller 504 accelerates or decelerates the changing of the x-y-z-position of the workpiece 310 while moving the workpiece 310 along a trajectory. This may lead to different cutting or ablation depths.

Figure 6:
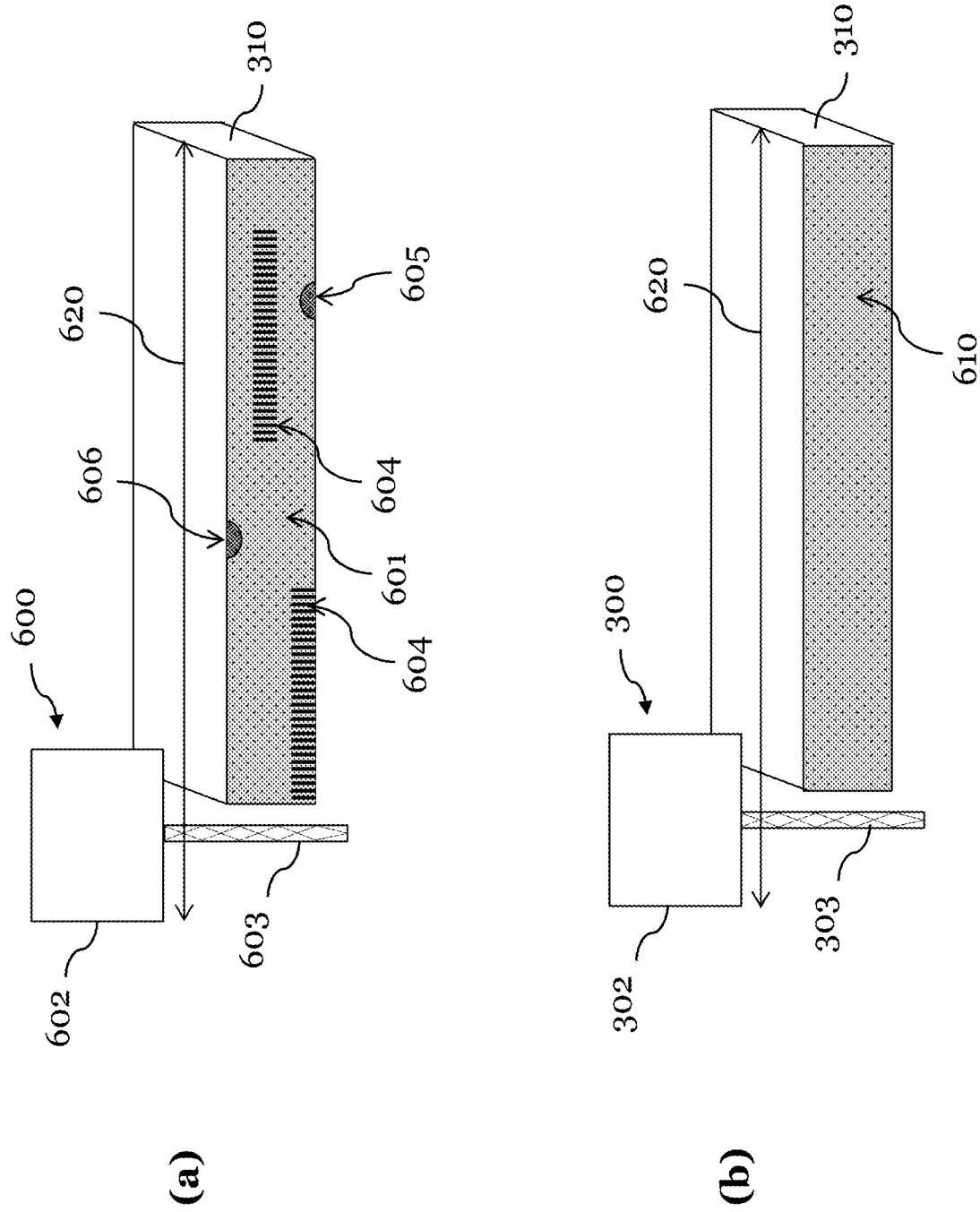
FIGS. 6(*a*) and (*b*) compare a cutting result achieved with a conventional method/apparatus with a cutting result achieved with a method/apparatus according to embodiments of the invention.

FIGS. 6(a) and (b) show schematically a comparison of a cutting result achieved with a conventional apparatus 600 and method (a), with a cutting result achieved with a method 100 and apparatus 300 according to embodiments of the invention (b).

In particular, the conventional apparatus 600 shown in (a) includes a machining unit 602 and outputs a fluid jet 603, into which a laser beam is coupled. This laser beam is a continuous or pulsed laser beam with a single pulsation. The laser beam in the fluid jet 603 is then moved over the workpiece 310 along a determined cutting path 620. Thereby, a cut surface (shaded) is created. However, disadvantageously the surface quality of the cut surface 601 is not very high. In particular, the surface 601 often has surface quality changes 604, which can occur anywhere along the cutting path on the cut surface. Furthermore, defects or chippings 605 and 606 occur along the edges of the cut. In particular, chippings 606 appear on the front side of the workpiece 310 (i.e. the side facing the apparatus 600), and chippings 605 appear on the backside of the workpiece 310.

If the workpiece 310 is, however, cut in the same manner with an apparatus 300 shown in (b) according to an embodiment of the invention, or generally with a method 100 according to an embodiment of the invention, along the same cutting path 620 the surface quality of the cut surface 610 is considerably improved. In particular, the cut surface 610 is a very uniform surface without any surface quality changes. Furthermore, defects caused e.g. by chipping are suppressed.

Figure 7:
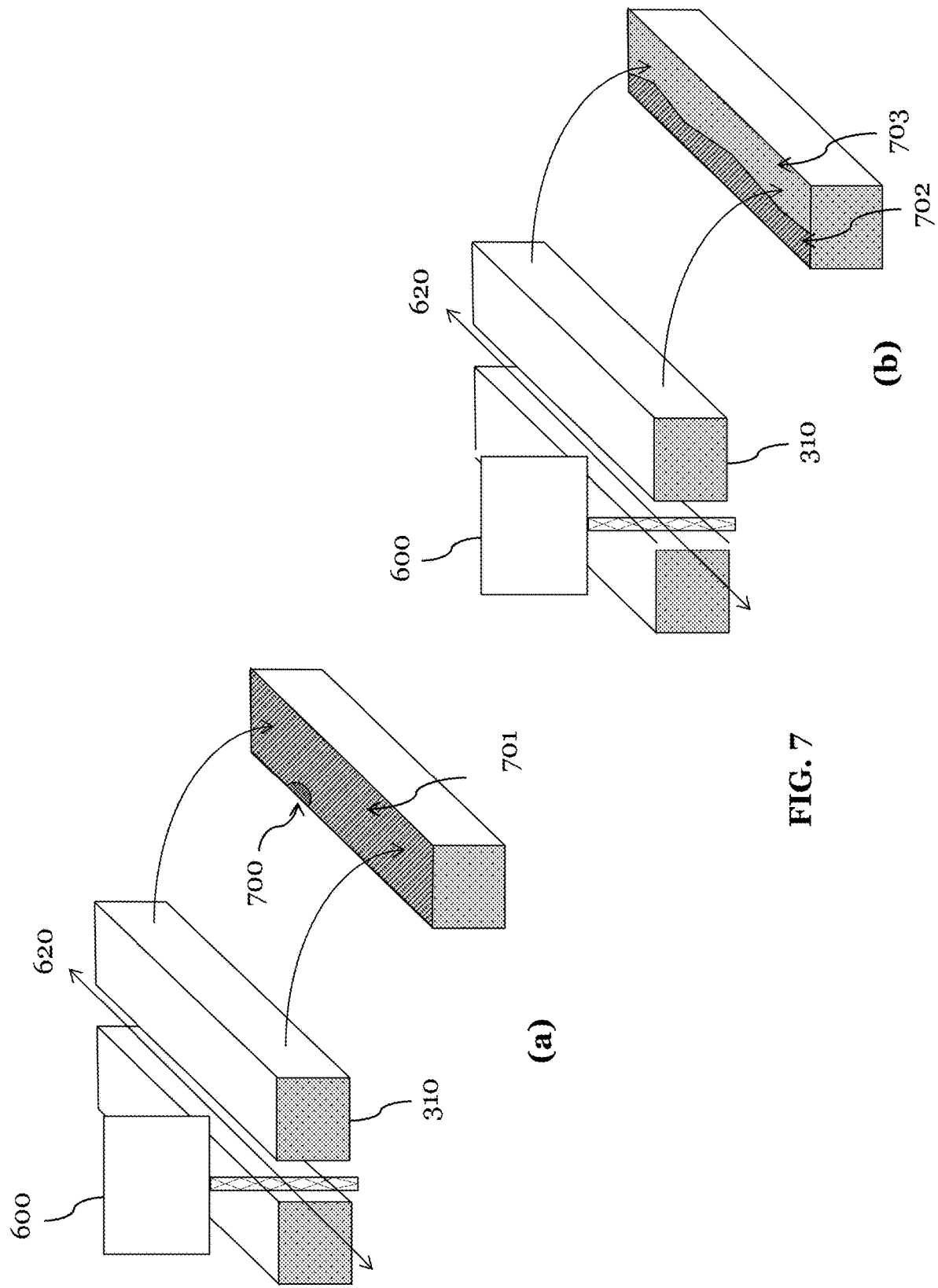
FIGS. 7(*a*) and (*b*) show cutting results achieved with a conventional method/apparatus.

FIGS. 7(a) and (b) show schematically cutting results achieved with a conventional method and apparatus 600 using different kinds of pulsed laser beams. In this respect, FIGS. 8(a) and (b) show schematically two conventional pulsed laser beams. Standard laser sources can only output one type of pulsation. In this respect, FIG. 8(a) shows a pulsation 801 with a higher power and a lower frequency, while FIG. 8(b) shows a pulsation 802 with a lower power and a higher frequency. Switching between different options, e.g. between such different pulsations 801 and 802 may cause instabilities of the laser beam and inaccurate results of the cut. FIGS. 7(a) and (b) show particularly in (a) a cutting result with the pulsation 801 and in (b) a cutting result with the pulsation 802 of FIGS. 8(a) and (b).

Figure 8:
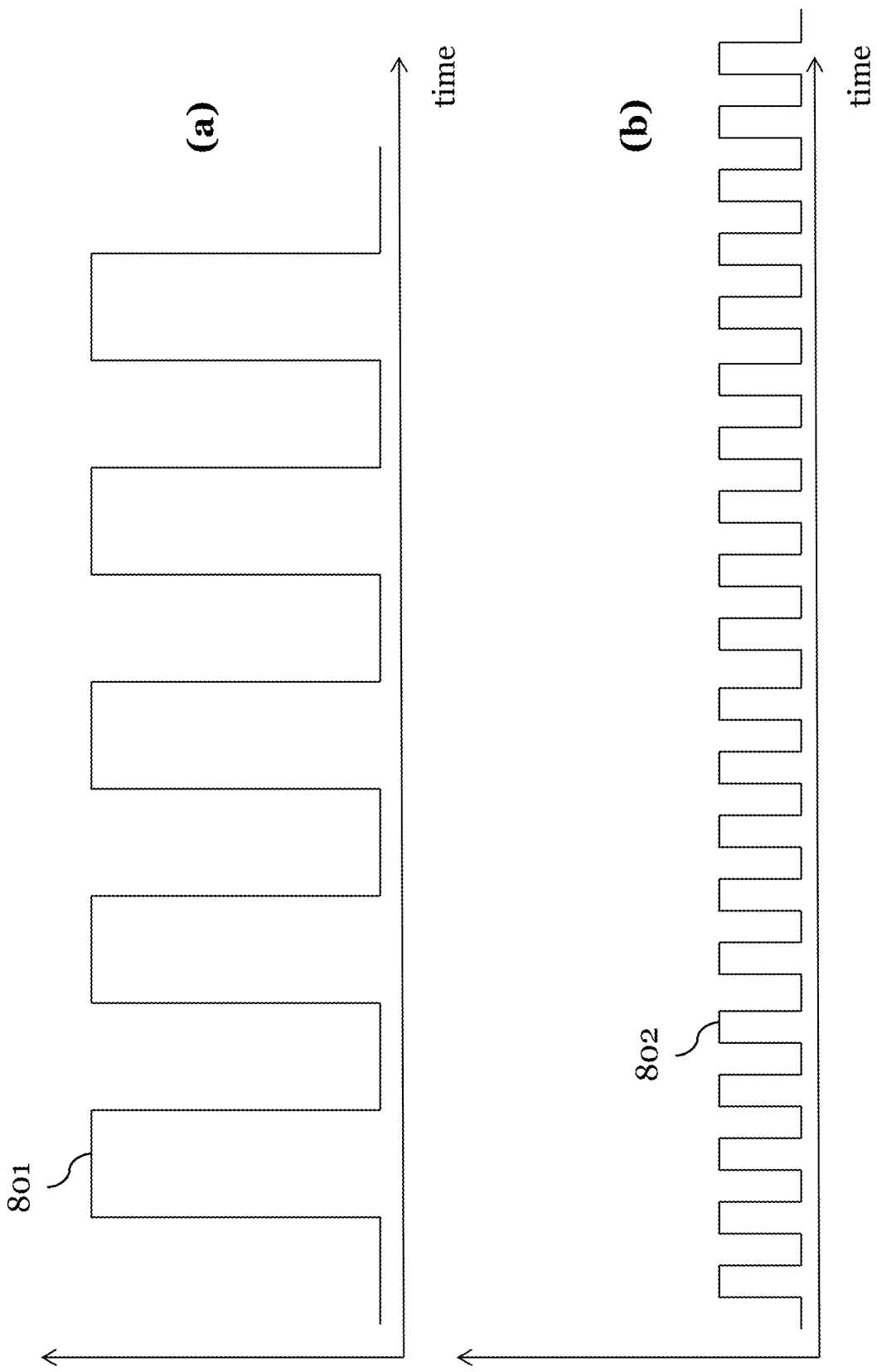
FIGS. 8(*a*) and (*b*) show conventional pulsed laser beams.

If a pulsation 801 with a higher power and lower frequency is used, chipping 700 occurs regularly, and a cut surface 701 shows a rather bad quality, however, it is not tapered. For example, cutting a phynox material with a larger pulse laser as shown in FIG. 8 (a) creates volcano-like structures on the cut surface, i.e. leads to a high surface roughness.

If a pulsation 802 with a lower power and higher frequency is used, chipping occurs less regularly, but the cut surface more often shows a taper and a bad quality surface. For example, a main problem when cutting a >0.25 mm thick metallic substrate with a shorter pulse laser as shown in FIG. 8 (b) generates a taper effect of >10 μm, and an acceptable surface roughness is obtained only on the first 100-200 μm from top to bottom side.

Figure 9:
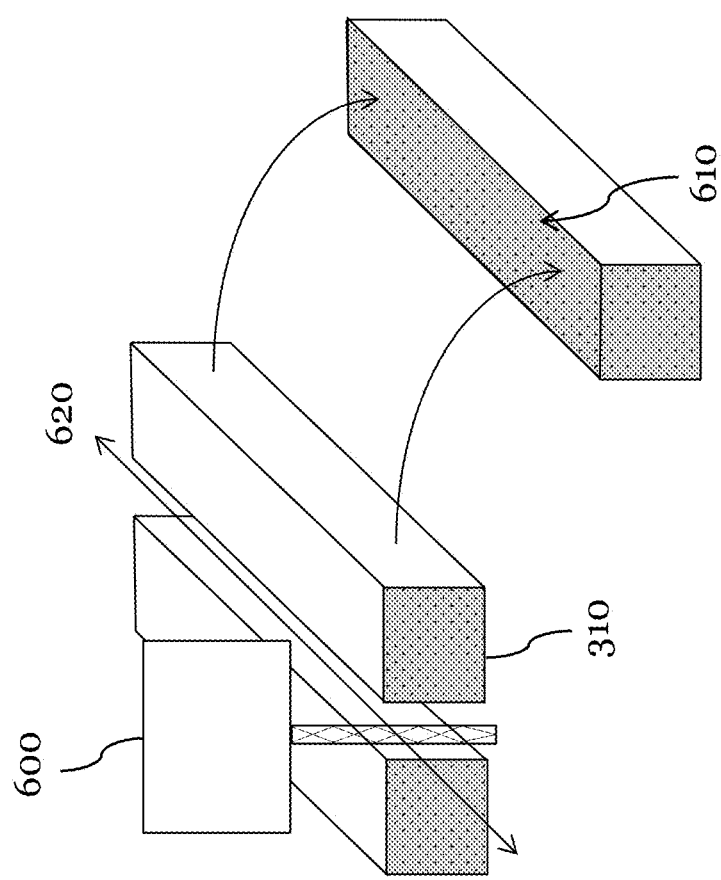
FIG. 9 shows a cutting result achieved with a method/apparatus according to embodiments of the invention.

FIG. 9 shows schematically a cutting result achieved with a method 100 and apparatus 300 according to embodiments of the invention, for a similar cutting path 620 as shown in FIGS. 7(a) and (b). A higher quality cut surface 610 is achieved, without any taper and chippings. Accordingly, the cutting quality is significantly improved over the conventional apparatus 600 and method.

In a default cutting strategy, which may be implemented with the method 100 according to an embodiment of the invention, the particular material of the workpiece 310 is cut only with the complex pulsed laser beam 200. Thereby, the workpiece 310 may be cut either in a single pass with a slower speed (i.e. all the material is cut in a single layer), or in a multi pass e.g. with a higher speed (i.e. several layers are necessary to remove all the material), or in a single or multi-pass but by leaving bridges to hold the material in the last pass (finishing pass) and then smoothing the surface and cutting the bridges.

Figure 10:
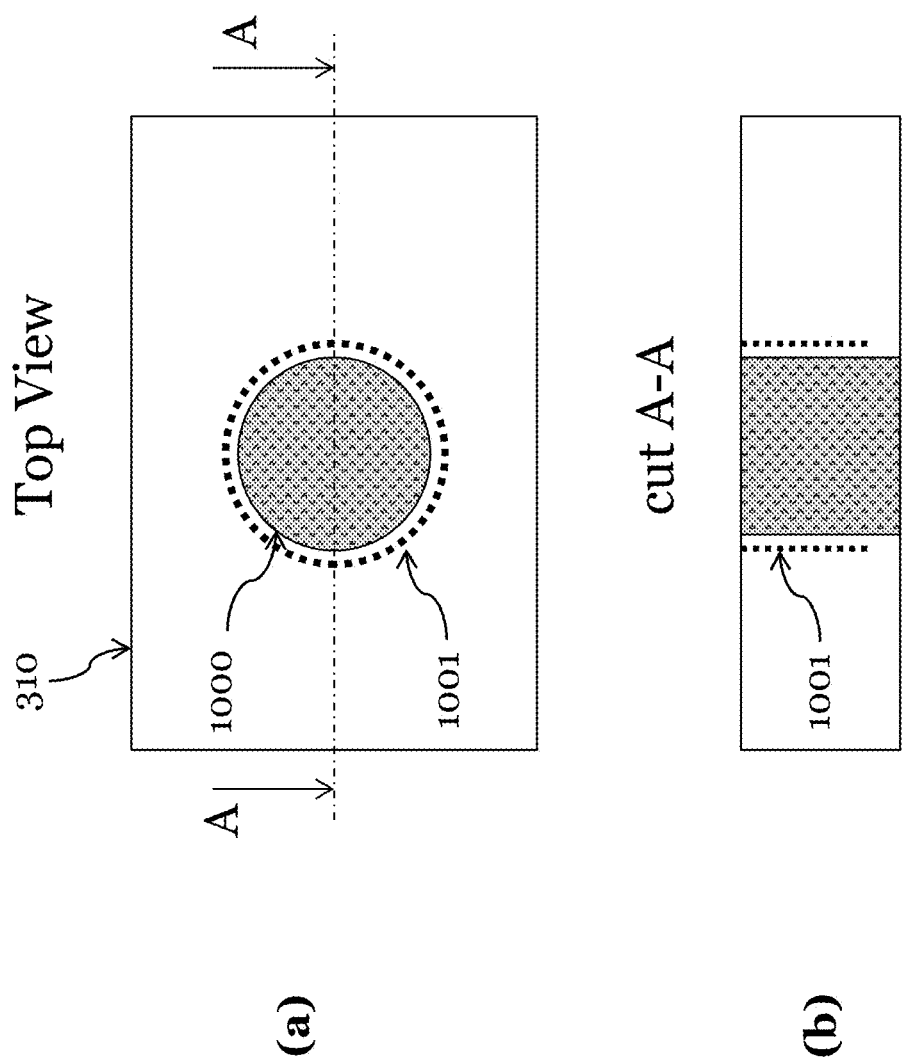
FIGS. 10(*a*) and (*b*) show a cutting strategy implemented with a method according to an embodiment of the invention.

FIGS. 10(a) and (b) show schematically an alternative cutting strategy, which can advantageously be implemented with a method 100 according to an embodiment of the invention. This strategy uses both a normal pulsed laser beam and a complex pulsed laser beam 200. In a first step, the particular material of the workpiece 310 may be machined by making a cut 1001 that is larger and/or has a lower depth than the final cut 1000. For example, it may be 10-60 μm larger and/or may have 90-95% of the depth of the final cut 1000. For this first step, it is possible to use only one of the at least two pulsations 201 and 202 described above (selected for the particular material), for a fast initial cutting of the workpiece by the cut 1001. Then, in a second step, the final cut 1000 can be made with the pulsed complex laser beam 200, i.e. in order to finish the desired cut in the workpiece 310. In summary, a faster cutting with a still higher surface quality is the result.

The present invention has been described in conjunction with various embodiments as examples as well as implementation forms. However, other variations can be understood and effected by those persons skilled in the art and practicing the claimed invention, from the studies of the drawings, the description and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A method (100) for cutting or ablating a particular material of a workpiece (310) with a pulsed laser beam (200), the method (100) comprising:
   producing (101) the pulsed laser beam (200) with at least one laser source (301, 301a),
   providing (102) a pressurized fluid jet (303) onto the workpiece (310), and
   coupling (103) the pulsed laser beam (200) into the fluid jet (303) towards the workpiece (310),
   wherein the pulsed laser beam (200) comprises at least two superimposed pulsations (201, 202) selected based on the particular material of the workpiece (310),
   wherein a first pulsation (201) of the at least two superimposed pulsations (201, 202) has a different power and frequency than a second pulsation (202) of the at least two superimposed pulsations (201, 202),
   wherein the first pulsation (201) is suitable to cut or ablate the particular material of the workpiece (310), and
   the second pulsation (202) is suitable to smooth a surface (610) created by cutting or ablating the particular material with the first pulsation (201).

2. The method (100) according to claim 1, wherein:
   the second pulsation (202) is not suitable to cut or ablate the particular material of the workpiece (310).

3. The method (100) according to claim 1, wherein:
   the second pulsation (202) is suitable to smooth the surface of a homogenous metallic or ceramic material as the particular material of the workpiece (310) to an arithmetic average of the roughness profile equal to or below 0.3 μm.

4. The method (100) according to claim 1, wherein:
   a thickness of the particular material of the workpiece (310) is 1 mm or more.

5. The method (100) according to claim 1, for cutting or ablating more than one material of the workpiece (310), wherein:
   the workpiece (310) comprises multiple different material layers, and the pulsed laser beam (200) comprises at least two superimposed pulsations (201, 202) selected per material layer of the workpiece (310).

6. A method (100) for cutting or ablating a particular material of a workpiece (310) with a pulsed laser beam (200), the method (100) comprising:
producing (101) the pulsed laser beam (200) with at least one laser source (301, 301a),
providing (102) a pressurized fluid jet (303) onto the workpiece (310), and
coupling (103) the pulsed laser beam (200) into the fluid jet (303) towards the workpiece (310),
wherein the pulsed laser beam (200) comprises at least two superimposed pulsations (201, 202) selected based on the particular material of the workpiece (310),
wherein a first pulsation (201) of the at least two superimposed pulsations (201, 202) has a different power and frequency than a second pulsation (202) of the at least two superimposed pulsations (201, 202),
wherein the at least two superimposed pulsations (201, 202) are selected based further on at least one parameter of the fluid jet (303).

7. The method (100) according to claim 1, wherein:
a frequency of the first pulsation (201) is of a different technical regime than a frequency of the second pulsation (202).

8. The method (100) according to claim 1, wherein:
the first pulsation (201) and the second pulsation (202) are synchronous.

9. The method (100) according to claim 1, wherein:
the first pulsation (201) and the second pulsation (202) are asynchronous.

10. The method (100) according to claim 1, wherein:
at least one of the first pulsation (201) and the second pulsation (202) comprises a burst of a plurality of individual sub-pulses.

11. The method (100) according to claim 1, wherein:
the particular material of the workpiece (310) is a cobalt-chromium-nickel alloy, or is a copper-zinc-nickel alloy, or a copper-based alloy, amorphous steel, the first pulsation (201) has a frequency of 4-8 kHz and a full width at half maximum, FWHM, pulse width of 90-160 ns, and
the second pulsation (202) has a frequency of 80-120 kHz and a FWHM pulse width of 5-20 ns.

12. The method (100) according to claim 1, wherein:
the particular material of the workpiece (310) is a semiconductor,
the first pulsation (201) has a frequency of 18-40 kHz and a FWHM pulse width of 200-500 ns, and
the second pulsation (202) has a frequency of 100-300 kHz and a FWHM pulse width of 15-30 ns.

13. The method (100) according to claim 1, wherein:
the particular material of the workpiece (310) is a hard material,
the first pulsation (201) has a frequency of 1-13 kHz and a FWHM pulse width of 100-190 ns, and
the second pulsation (202) has a frequency of 50-150 kHz and a FWHM pulse width of 6-20 ns.

14. An apparatus (300) to carry out the method (100) of claim 1 for cutting or ablating a particular material of the workpiece (310) with the pulsed laser beam, the apparatus (300) comprising:
the at least one laser source (301, 301a) configured to produce the pulsed laser beam (200), and
a machining unit (302) configured to provide the pressurized fluid jet (303) onto the workpiece (310) and to couple the pulsed laser beam (200) into the fluid jet (303) towards the workpiece (310).

15. The apparatus (300) according to claim 14, further comprising:
an optical arrangement (400) configured to combine laser light emitted by each of the plurality of laser sources (301, 301a), in order to produce the pulsed laser beam (200), and
an optical coupling element (402) configured to guide the pulsed laser beam (200) to the machining unit (302).

16. The apparatus (300) according to claim 14, wherein:
the laser light emitted by the plurality of laser sources (301, 301a) comprises at least two different pulsation frequencies and/or two different colors.

* * * * *